(12) United States Patent
Nishimura

(10) Patent No.: US 7,646,406 B2
(45) Date of Patent: Jan. 12, 2010

(54) IMAGE TAKING APPARATUS

(75) Inventor: Tomoyuki Nishimura, Asaka (JP)

(73) Assignee: Fujifilm Corporation, Tokyo (JP)

( * ) Notice: Subject to any disclaimer, the term of this patent is extended or adjusted under 35 U.S.C. 154(b) by 688 days.

(21) Appl. No.: 11/064,456

(22) Filed: Feb. 24, 2005

(65) Prior Publication Data
US 2005/0185066 A1    Aug. 25, 2005

(30) Foreign Application Priority Data
Feb. 25, 2004    (JP) ............................. 2004-049339

(51) Int. Cl.
*H04N 5/235* (2006.01)
*H04N 5/217* (2006.01)
*H04N 9/64* (2006.01)

(52) U.S. Cl. ..................... 348/229.1; 348/241; 348/251

(58) Field of Classification Search ............. 348/229.1, 348/370, 371, 241, 251
See application file for complete search history.

(56) References Cited

U.S. PATENT DOCUMENTS

| | | | | |
|---|---|---|---|---|
| 4,935,808 | A * | 6/1990 | Hashimoto | 348/283 |
| 2001/0030278 | A1* | 10/2001 | Koshimizu | 250/208.1 |
| 2002/0008760 | A1* | 1/2002 | Nakamura | 348/222 |
| 2002/0094131 | A1* | 7/2002 | Shirakawa | 382/274 |
| 2002/0135688 | A1* | 9/2002 | Niikawa | 348/251 |
| 2003/0099407 | A1* | 5/2003 | Matsushima | 382/274 |

FOREIGN PATENT DOCUMENTS

| | | |
|---|---|---|
| JP | 6-178198 | 6/1994 |
| JP | 2002-290829 | 10/2002 |

OTHER PUBLICATIONS

Japanese Office Action dated Dec. 2, 2008 with English Translation.

* cited by examiner

*Primary Examiner*—Timothy J Henn
*Assistant Examiner*—Tuan H Le
(74) *Attorney, Agent, or Firm*—McGinn IP Law Group, PLLC

(57) ABSTRACT

The invention provides an image taking apparatus for shortening image taking time and obtaining a high quality image by preventing deterioration of the S/N ratio. A digital camera that performs image taking for generating image signals by capturing, with a CCD, object light sent via an image taking optical system includes: a shading correction section performing shading correction by adjusting gain depending on respective positions on the CCD; a scene determination section determining that a scene just shot is to be corrected if the scene just shot includes a uniform region with a predetermined or more area and a predetermined or higher brightness; and a shading correction control section causing, if the scene just shot is determined by the scene determination section to be a scene to be corrected, the shading correction section to perform shading correction on an image signal obtained by image taking just performed.

1 Claim, 11 Drawing Sheets

IMAGE TAKING APPARATUS

BACKGROUND OF THE INVENTION

1. Field of the Invention

The present invention relates to an image taking apparatus that performs image taking for generating an image signal by capturing, with an image pickup device, object light sent via an image taking optical system.

2. Description of the Related Art

A charge coupled device (CCD) is widely used as an image pickup device for a digital camera, one of image taking apparatuses. The CCD is provided with plural photoelectric conversion elements, such as a photodiode, for converting incident object light into an image signal, which is an electrical signal. Furthermore, many CCDs are provided with a lot of microlenses arranged corresponding to plural photoelectric conversion elements in order to increase the amount of incident light into each of the lot of photoelectric conversion elements. In such CCDs, the rate of condensation of light into a photoelectric conversion element differs depending on the angle of the incident light into a microlense. For example, the larger the angle of the incident light into the microlense is, the farther the portion where light is condensed is away from the center of the photoelectric conversion element. Furthermore, there may be caused a phenomenon that, when the object light passes through an image taking optical system constituted by an image taking lens and the like, the object light that passes through the periphery of the image taking optical system is darkened in comparison with the object light that passes through the vicinity of the central axis of the image taking optical system. Therefore, when uniform object light, for example all in red, is received by a CCD via an image taking optical system, difference is caused among image signals from respective photoelectric conversion elements even though the object light was uniform. As a result, there is caused a shading phenomenon on an image on the display screen which has been obtained through image taking, that color differs depending on positions on the screen.

There is also arranged a color filter for acquiring color signals of red (R), green (G) and blue (B) on the CCD. In this case, since infrared rays in object light passes through the color filter, there is generally arranged an infrared-ray cutting filter (an IR filter) for filtering out the infrared rays at the front of the CCD. However, the shading phenomenon may be caused after all on an image on the display screen which has been obtained through image taking, because of cut-off frequency difference or transmittance difference at a particular frequency caused due to manufacture difference of the infrared ray cutting filter.

The angle of incident light into microlenses constituting the CCD changes depending on the diaphragm opening of a camera lens. Accordingly, there is proposed a technique as follows. That is, sensitivity values of a CCD corresponding to diaphragm values of a camera lens are stored as correction data, and when an image is taken, gain of an amplifier for amplifying an image signal outputted from the CCD is adjusted with the correction data to correct the sensitivity of the CCD, and thereby shading is corrected (see Japanese Patent Laid-Open No. 06-178198).

In the technique proposed in the Japanese Patent Laid-Open No. 06-178198, shading correction is performed by adjusting gain of an amplifier with data for sensitivity correction depending on the diaphragm value of a camera lens for all the pixels and respective regions on the screen where an image is displayed. Therefore, there is a problem that a long processing time (operation time) is required for performing the shading correction, and therefore a long image taking time is required. Furthermore, shading correction is performed for all the pixels and respective regions on the screen, and therefore there is also a problem that the S/N ratio, the ratio of necessary strength of an image signal to strength of unnecessary noise, is deteriorated. In addition, shading correction by adjusting gain of an amplifier for respective regions on the screen leads to uneven S/N ratio and thus makes it difficult to obtain a high-quality image.

SUMMARY OF THE INVENTION

In consideration of the above circumstances, the present invention provides an image taking apparatus capable of shortening image taking time and enabling a high-quality image to be obtained by preventing deterioration of the S/N ratio.

A first image taking apparatus among image taking apparatuses of the present invention is an image taking apparatus that performs image taking for generating an image signal by capturing, with an image pickup device, object light sent via an image taking optical system, the image taking apparatus having:

a shading correction section that performs shading correction by adjusting gain depending on respective positions on the image pickup device;

a scene determination section that determines whether a scene just shot is a scene to be corrected which includes a uniform region with a predetermined or more area; and a shading correction control section that, if a scene just shot is determined by the scene determination section to be a scene to be corrected, causes the shading correction section to perform shading correction on an image signal obtained by image taking just performed.

If a scene just shot includes a uniform region (for example, the sky or a white wall) with a predetermined or more area, that is, if shading caused by sensitivity unevenness of the image pickup device is apparent, the first image taking apparatus of the present invention determines that the scene just shot is a scene to be corrected and performs shading correction. On the contrary, if the scene just shot does not include a uniform region with a predetermined or more area (for example, only regions with complicated patterns and figures), shading caused by sensitivity unevenness of the image pickup device is not apparent. Therefore, the first image taking apparatus determines that the scene is not a scene to be corrected, and does not perform shading correction. Thereby, processing time required for shading correction and image taking time can be shortened, and a high-quality image can be obtained by prevention of deterioration of the S/N ratio.

In this case, it is desirable that the scene determination section of the first image taking apparatus of the present invention, instead of the determination of a scene to be corrected in the manner described above, determines that a scene just shot is a scene to be corrected if the scene just shot includes a uniform region with a predetermined or more area and a predetermined or higher brightness.

Thereby, shading correction is not performed for a uniform region where shading is not apparent, that is, where the brightness is low (for example, the night sky), and accordingly image taking time can be further shortened.

Furthermore, a second image taking apparatus among image taking apparatuses of the present invention is an image taking apparatus that performs image taking for generating an image signal by capturing, with an image pickup device, object light sent via an image taking optical system, the image taking apparatus having:

a shading correction section that performs shading correction by adjusting gain depending on respective positions on the image pickup device;

a scene determination section that determines whether a scene just shot is a scene to be corrected which has been shot under a predetermined or higher object brightness;

a shading correction control section that, if the scene just shot is determined by the scene determination section to be a scene to be corrected, causes the shading correction section to perform shading correction on an image signal obtained by image taking just performed.

If a scene just shot is a scene to be corrected which has been shot under a predetermined or higher object brightness (for example, a scene shot under sunlight), that is, if shading caused by sensitivity unevenness of the image pickup device is apparent, the second image taking apparatus of the present invention determines that the scene just shot is a scene to be corrected and performs shading correction. On the contrary, if the scene just shot has been shot under an object brightness below a predetermined brightness (for example, a night view scene), that is, if shading caused by sensitivity unevenness of the image pickup device is not apparent, the second image taking apparatus determines that the scene is not a scene to be corrected, and does not perform shading correction. Thereby, processing time required for shading correction and image taking time can be shortened, and a high-quality image can be obtained by prevention of deterioration of the S/N ratio.

In this case, it is desirable that the second image taking apparatus of the present invention includes a flash emission section that emits a flash toward an object in synchronization with image taking; and the shading correction control section does not cause the shading correction section to perform shading correction on an image signal obtained by image taking with the use of the flash emission section even if a scene to be corrected is determined by the scene determination section.

Image taking with the use of a flash emission section is often performed at a relatively dark place, that is, under an object brightness below a predetermined brightness. Accordingly, by preventing shading correction from being performed for an image signal obtained through image taking with the use of a flash emission section, image taking time can be further shortened.

Furthermore, a third image taking apparatus among image taking apparatuses of the present invention is an image taking apparatus that performs image taking for generating an image signal by capturing, with an image pickup device, object light sent via an image taking optical system, the image taking apparatus having:

an infrared-ray cutting filter that filters out infrared rays in the object light, the infrared-ray cutting filter being arranged at the front of the image pickup device;

a shading correction section that performs shading correction by adjusting gain depending on respective positions on the image pickup device;

a scene determination section that determines whether a scene just shot is a scene to be corrected which has been shot under a light source requiring shading correction because of spectral displacement of the infrared ray cutting filter; and a shading correction control section that, if a scene just shot is determined by the scene determination section to be a scene to be corrected, causes the shading correction section to perform shading correction on an image signal obtained by image taking just performed.

If a scene just shot has been shot under a light source requiring shading correction because of spectral displacement of the infrared ray cutting filter (for example, under sunlight), the third image taking apparatus of the present invention determines that the scene just shot is a scene to be corrected since shading is apparent because of cut-off frequency difference or transmittance difference at a particular frequency caused by manufacture difference of the infrared ray cutting filter, and then performs shading correction. On the contrary, if the scene just shot has been shot under a light source which does not require shading correction to be performed because of spectral displacement of the infrared ray cutting filter (for example, under fluorescent light), there is only a particular frequency component and, therefore, only little influence by cut-off frequency difference or transmittance difference at a particular frequency, and shading is not apparent. Accordingly, the third image taking apparatus of the present invention determines that the scene is not a scene to be corrected and does not perform shading correction. Thereby, processing time required for shading correction and therefore image taking time can be shortened, and a high-quality image can be obtained by prevention of deterioration of the S/N ratio.

In this case, it is desirable that the third image taking apparatus of the present invention includes a flash emission section that emits a flash toward an object in synchronization with image taking; and the shading correction control section does not cause the shading correction section to perform shading correction on an image signal obtained by image taking with the use of the flash emission section even if a scene to be corrected is determined by the scene determination section.

Image taking with the use of a flash emission section is often performed at a relatively dark place, that is, under a light source other than a light source which requires shading correction (for example, sunlight). Accordingly, by preventing shading correction from being performed for an image signal obtained through image taking with the use of a flash emission section, image taking time can be further shortened.

According to the present invention, it is possible to provide an image taking apparatus capable of shortening image taking time and enabling a high-quality image to be obtained by preventing deterioration of the S/N ratio.

DETAILED DESCRIPTION OF THE INVENTION

Embodiments of the present invention will be now described below.

Figure 1:
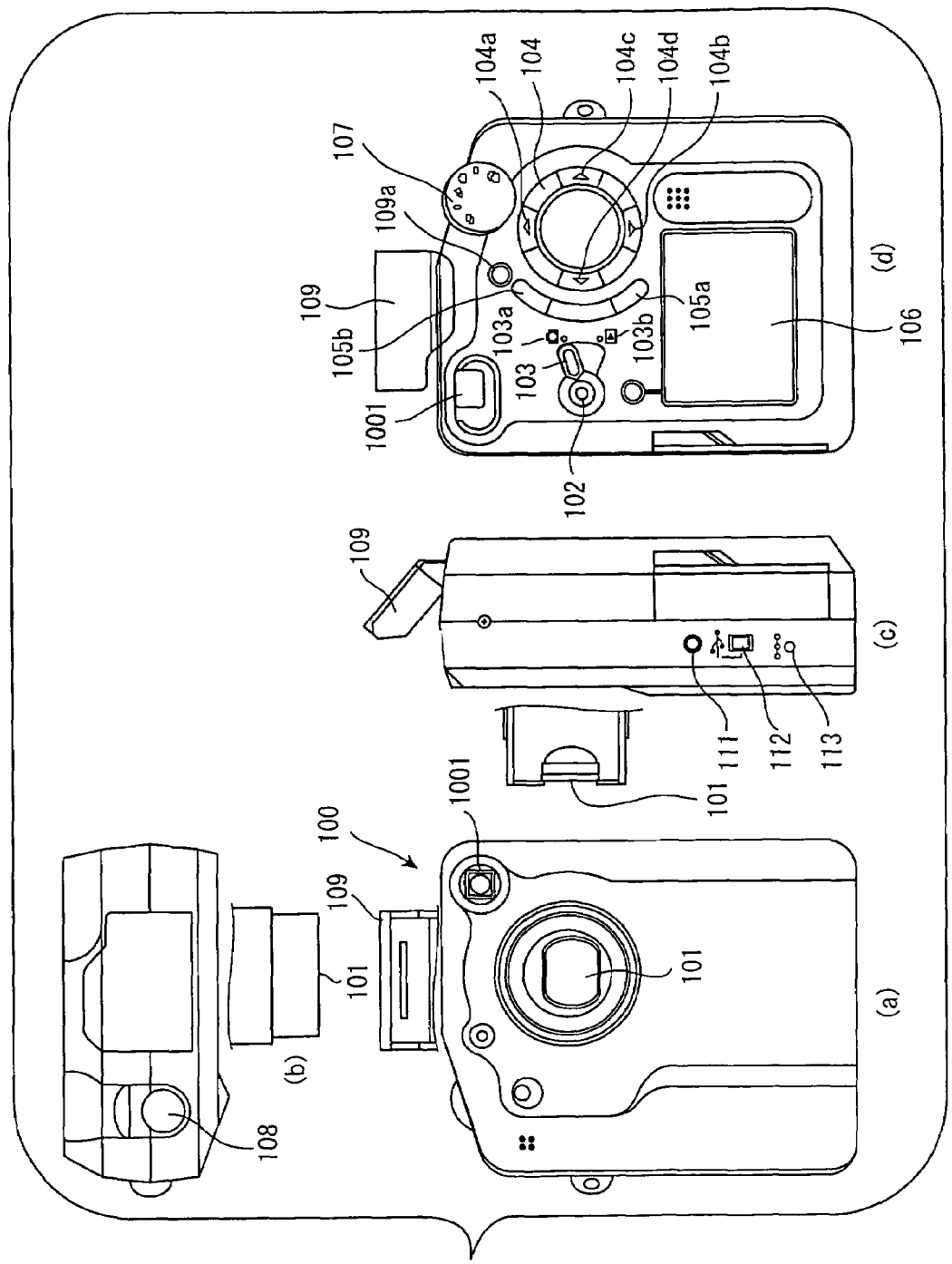
FIG. 1 is an external view of a digital camera, an embodiment of a first image taking apparatus of the present invention.

FIG. 1 is an external view of a digital camera, an embodiment of the first image taking apparatus of the present invention. FIGS. 1(a), (b), (c) and (d) are a front view, a top view, a side view and a back view, respectively.

A digital camera 100 shown in FIG. 1(a) to (d) is an image taking apparatus that performs image taking for generating an image signal by capturing, with an image pickup device, object light sent via a zoom lens 101 constituting an image taking optical system.

In order to enable this digital camera 100 to freely perform image taking, there are provided a power switch 102 for powering on the digital camera 100 for operation, an image taking mode/replay mode switching lever 103 for freely switching an image taking mode and a replay mode, a mode dial 107, a pop-up switch 109a and the like at the back of the digital camera 100 of this embodiment as shown in FIG. 1(d). In the mode dial 107 among the switches, there are a switch 1071 for a manual image taking mode (M) (see FIG. 2), a switch 1072 for a still image taking mode, a switch 1073 for an automatic image taking mode (AUTO), a switch 1074 for a scene position mode (SP) and a switch 1075 for a dynamic image taking mode. An image taking switch 103a is selected with the image taking mode/replay mode switching lever 103. Any mode is then selected with the mode dial 107. When a release button 108 located at the upper part of the digital camera 100 is operated, a direction to start image taking is communicated to the inside of the camera, and an image taking processing corresponding to the mode is performed inside the digital camera 100. If the automatic image taking mode (AUTO) is selected with the mode dial 107, then image taking is performed under image taking conditions automatically adjusted. If the manual image taking mode (M) is selected, then at least one of image taking conditions is manually set, and image taking is performed under the manually set image taking conditions. If the still image taking mode is selected, then image taking is performed under image taking conditions suitable for still image taking, and if the dynamic image taking mode is selected, then image taking is performed under image taking conditions suitable for dynamic image taking. Furthermore, if the scene position mode (SP) is selected, then image taking is performed under image taking conditions suitable for the scene to be shot.

In the case of performing image taking at night, by operating the pop-up switch 109a, a flash emission section 109 is popped up and a flash is emitted toward an object in synchronization with image taking. If the flash emission section 109 is not popped up, the flash is off.

There is also provided an image display device (LCD) 106 for displaying through images when the image taking mode/replay mode switching lever 103 is switched to the image taking mode and for showing operation condition and the like of each switch to a user. Framing can be performed with the use of the image display device 106 as a finder or with the use of a direct vision finder 1001 as shown in FIG. 1(a).

There is provided a cross key 104 as an operation key above the upper right of the image display device 106. If a menu screen is displayed on the image display device 106, selection can be made from the menu by operating four keys of the cross key 104; UP key 104a, DOWN key 104b, RIGHT key 104c and LEFT key 104d. On the left side of the cross key 104, there are provided a menu button 105a for displaying the menu on the image display device 106 and a back button 105b for, when the menu is displayed by operation of the menu button 105a and any of many selection items on the menu screen displayed on the image display device 106 is selected by any of the keys of the cross key 104, canceling the selection. The menu button 105a and the back button 105b function as tele/wide zoom switches when an image is displayed.

When the image taking mode/replay mode switching lever 103 is switched to a replay mode switch 103b, any of image data recorded on a recording medium is read and an image based on the image data is displayed on the image display device 106.

Furthermore, as shown in FIG. 1(c), at the side of the digital camera 100, there are provided a picture output terminal 111 to which a cable is connected for outputting image data of an object shot by the digital camera 100 to a television set, a projector and the like, a USB connector 112 to which a USB cable is connected for transmitting image data of an object shot by the digital camera 100 to a personal computer provided with a USB connector, and a direct voltage input terminal 113 to which direct voltage from an AC adapter is inputted.

Figure 2:
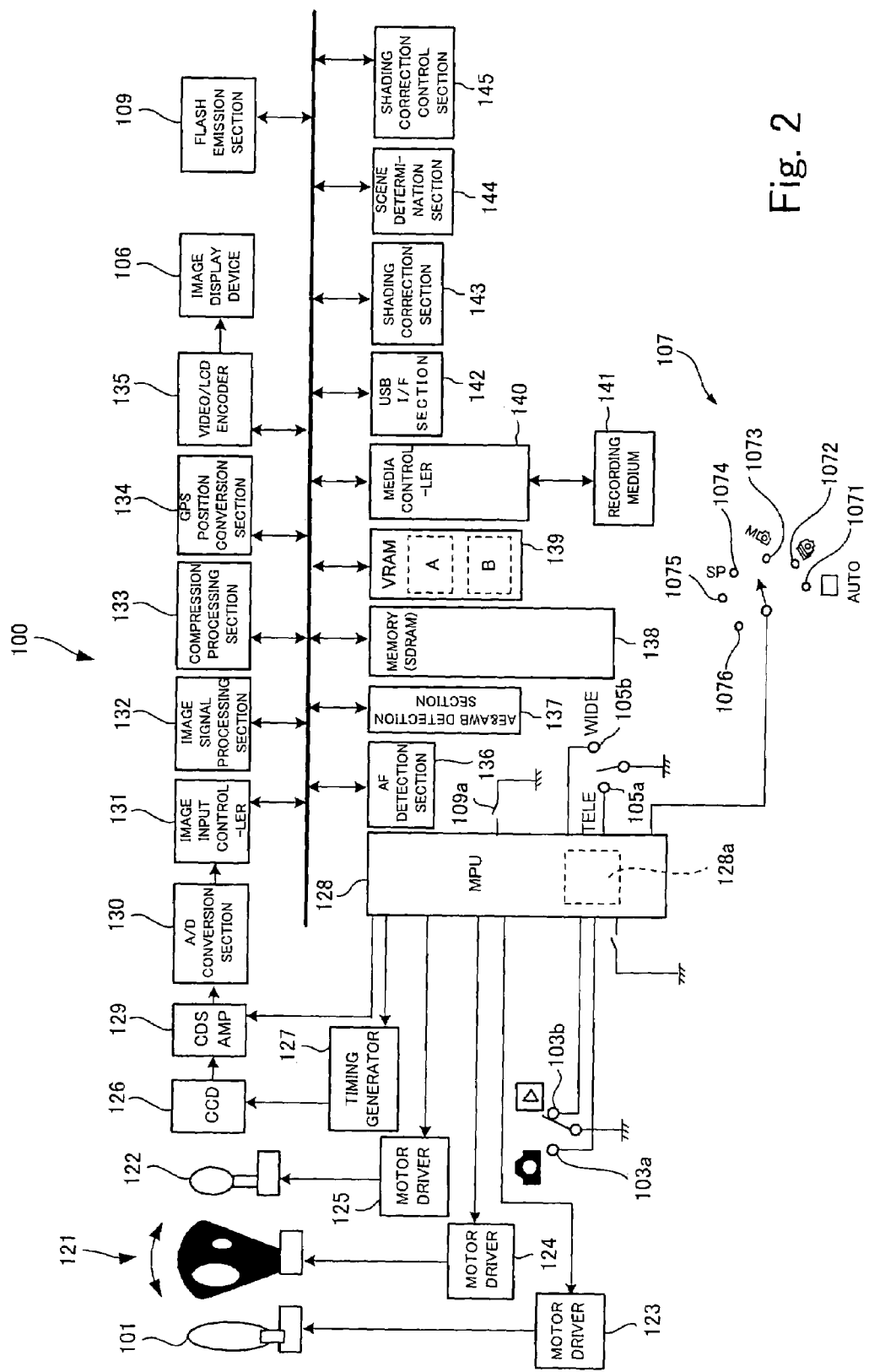
FIG. 2 shows the internal configuration of the digital camera shown in FIG. 1.

FIG. 2 shows the internal configuration of the digital camera shown in FIG. 1.

The digital camera 100 is provided with a zoom lens 101, an iris 121, a focus lens 122, and motor drivers 123, 124 and 125 for driving the zoom lens 101, the iris 121 and the focus lens 122 to perform zooming, focusing and exposure adjustment.

The digital camera 100 is also provided with a CCD 126, a timing generator 127, a micro processor unit (MPU) 128 and a CDSAMP 129.

The CCD 126 corresponds to an example of the image pickup device described in the present invention and is a solid image pickup device for capturing object light sent via the zoom lens 101, the iris 121 and the focus lens 122. The CCD 126 is provided with a lot of photoelectric conversion elements, such as a photodiode, for converting incident object light into an image signal, which is an electrical signal. There are also provided a lot of microlenses arranged corresponding to the lot of photoelectric conversion elements in order to increase the amount of incident light into each of the lot of photoelectric conversion elements.

The timing generator 127 drives the CCD 126 at a predetermined timing in response to a direction from the MPU 128. This causes the incident object light in the CCD 126 to be photoelectrically converted at a predetermined frame rate and outputted from the CCD 126 as an analog image signal.

The MPU 128 controls the entire digital camera 100. Specifically, a ROM 128a is included in the MPU 128, and the operation of the entire digital camera 100 is controlled in accordance with the procedure of a program on the included ROM 128a.

Furthermore, the digital camera 100 is provided with a CDSAMP 129 for performing a processing for reducing noise of an analog image signal outputted from the CCD 126, and the like; an A/D conversion section 130 for analog/digital converting an analog image signal for which such processing has been performed into a digital image signal; and an image input controller 131 for transferring image data consisting of RGB which has been converted into a digital image signal by the A/D conversion section 130 to an SDRAM 138 which is a memory, via a data bus.

Furthermore, the digital camera 100 is provided with an image signal processing section 132 that executes an image processing process of causing the image data in the SDRAM 138 to be read and converting the image data into a YC signal; a compression processing section 133 for executing a JPEG process at the end of the image processing process to compress the image data; a GPS position conversion section 134 for converting a GPS position (current position) data obtained by receiving a GPS signal from a GPS satellite into image taking data; and a video/LCD encoder 135 for converting the image data or image taking data into a video signal and leading it to the image display device 106.

Furthermore, the digital camera 100 is provided with an AF detection section 136 for detecting focus information on an image; an AE & AWB detection section 137 for detecting brightness information and white balance information on an image; the SDRAM 138 which is also used as memory for work area; a VRAM 139 as a buffer for display having A region and B region; a media controller 140 for performing control for storing image data in a recording medium 141; and a USB I/F section 142 for sending/receiving image data between the digital camera 100 and an external personal computer and the like.

Furthermore, the digital camera 100 is provided with a shading correction section 143, a scene determination section 144 and a shading correction control section 145, which are characteristics of this embodiment.

The shading correction section 143 performs shading correction by adjusting gain depending on positions on the CCD 126.

The scene determination section 144 determines that a scene just shot is a scene to be corrected if there exists in the scene just shot a uniform region with a predetermined or more area and a predetermined or higher brightness.

If the scene just shot is determined by the scene determination section 144 to be a scene to be corrected, the shading correction control section 145 causes the shading correction section 143 to perform shading correction on the image signal obtained by the image taking just performed. The detailed operations of the shading correction section 143, the scene determination section 144 and the shading correction control section 145 will be described later.

The schematic operation of the digital camera 100 will be now described. The MPU 128 performs overall control of the operation of the digital camera 100. The ROM 128a is included in the MPU 128, and a program is stored in the included ROM 128a. The operation of the entire digital camera 100 is controlled by the MPU 128 in accordance with the procedure of the program. Image data being processed is temporarily stored in the SDRAM 138 while the MPU 128 controls the entire digital camera 100 in accordance with the procedure of the program described on the ROM 128a.

In A region and B region of the VRAM 139 as a buffer for display, image data representing through images is sequentially stored. The image data in these regions is alternatively supplied to the video/LCD encoder 135, and images based on the image data are sequentially switched and displayed on the image display device 106 as through images.

First, description will be made with reference to FIG. 2 on the flow of image data to be created in the case that the mode dial 107 (see FIG. 1) is switched to the automatic image taking mode (AUTO) and an image is taken.

When the mode dial 107 is switched to the automatic image taking mode (AUTO), the MPU 128 captures, with the CCD 126, object light sent via an image taking optical system; causes image data generated by the CCD 126 to be outputted to the CDSAMP 129 at a predetermined interval and converted into displayable image data through the A/D conversion section 130, the image input controller 131 and the image signal processing section 132; and causes through images to be displayed on the screen of the image display device 106. Arbitrary framing is performed based on the through images, and the AF detection section 136 continuously moves the focus lens 122 back and forward to detect a focused focal point, and such an image is formed on the CCD 126 that a focal point is focused on the center of a frame. In this case, object brightness is detected by the AE & AWB detection section 137. A small diaphragm opening or an open diaphragm is set by the motor driver 124 based on the detection result, and gain of each of the color signals of R, G and B is adjusted for white balance adjustment. As described above, image data which represents an image data for which exposure has been adjusted based on the brightness of field and a focal point is focused, is outputted to the CDSAMP 129 at a predetermined interval in response to a timing signal from the timing generator 127; and through images are obtained at the subsequent stage. The user performs framing looking at the through images and performs a release operation at the right moment.

When the release operation is performed, the MPU 128 causes the timing generator 127 to supply a timing signal to form an image at the release operation on the CCD 126. This timing signal is for notifying the CCD 126 of start and end of exposure and is equivalent to the shutter speed. The MPU 128 causes image data (image data constituted by RGB, red, green and blue) to be outputted from the CCD 126 at the end of exposure and supplied to the subsequent-stage CDSAMP 129. Furthermore, noise of the image data outputted from the CCD 126 are reduced at the CDSAMP 129, and the image data with reduced noise is converted into a digital signal by the A/D conversion section 130. The image data constituted by RGB, which has been converted into a digital signal by the A/D conversion section 130, is supplied to the SDRAM 138 via a data bus by the subsequent-stage image input controller 131. Image data for all the pixels on the CCD 126 is stored in the SDRAM 138. When the image data corresponding to all the pixel data is stored in the SDRAM 138, the MPU 128 activates the image processing process of the image signal processing section 132 and causes the image data in the SDRAM 138 to be read and converted into a YC signal through the image processing process. Furthermore, when detecting that the image processing process by the image signal processing section 132 has ended, the MPU 128 activates the JPEG process of the compression processing section 133 and causes the image data to be compressed through the JPEG process. When detecting that the compression at the compression processing section 133 has been completed, the MPU 128 then activates a recording processing process and causes the JPEG compressed image data to be recorded to the recording medium 141 via the media controller 140 together with image taking data indicating the GPS position converted at the GPS position conversion section 134 as necessary. The flow of image taking data in the case of the automatic image taking mode has been described above.

Description will be now made on the processing of image data to be performed when the mode dial 107 is switched to the manual image taking mode.

When the mode dial 107 is switched to the manual image taking mode (M), image taking conditions are manually set to perform image taking. Though a focal point, one of image taking conditions, can be arbitrarily set in this digital camera 100, an exposure condition will be described below as an example of image taking conditions.

When the mode dial 107 is switched to the manual image taking mode (M), a display screen for correcting the exposure correction value, sharpness, flash light intensity and the like is displayed on the image display device 106 together with a through image. The selection items on the display screen, for example, switching of an exposure value can be performed with the cross key 104.

As described above, in the manual image taking mode, the user can arbitrarily set image taking conditions, and image taking is performed under the image taking conditions.

When image taking is performed in such a manual image taking mode, the image taking is immediately performed in accordance with the set image taking conditions whether exposure is under-exposure or over-exposure. For example, determination of under-exposure or over-exposure is made by the MPU 128 based on the result of detection by the AE & AWB detection section 137.

The operations of the shading correction section 143, the scene determination section 144 and the shading correction control section 145 will be now described with reference to FIG. 3.

Figure 3:
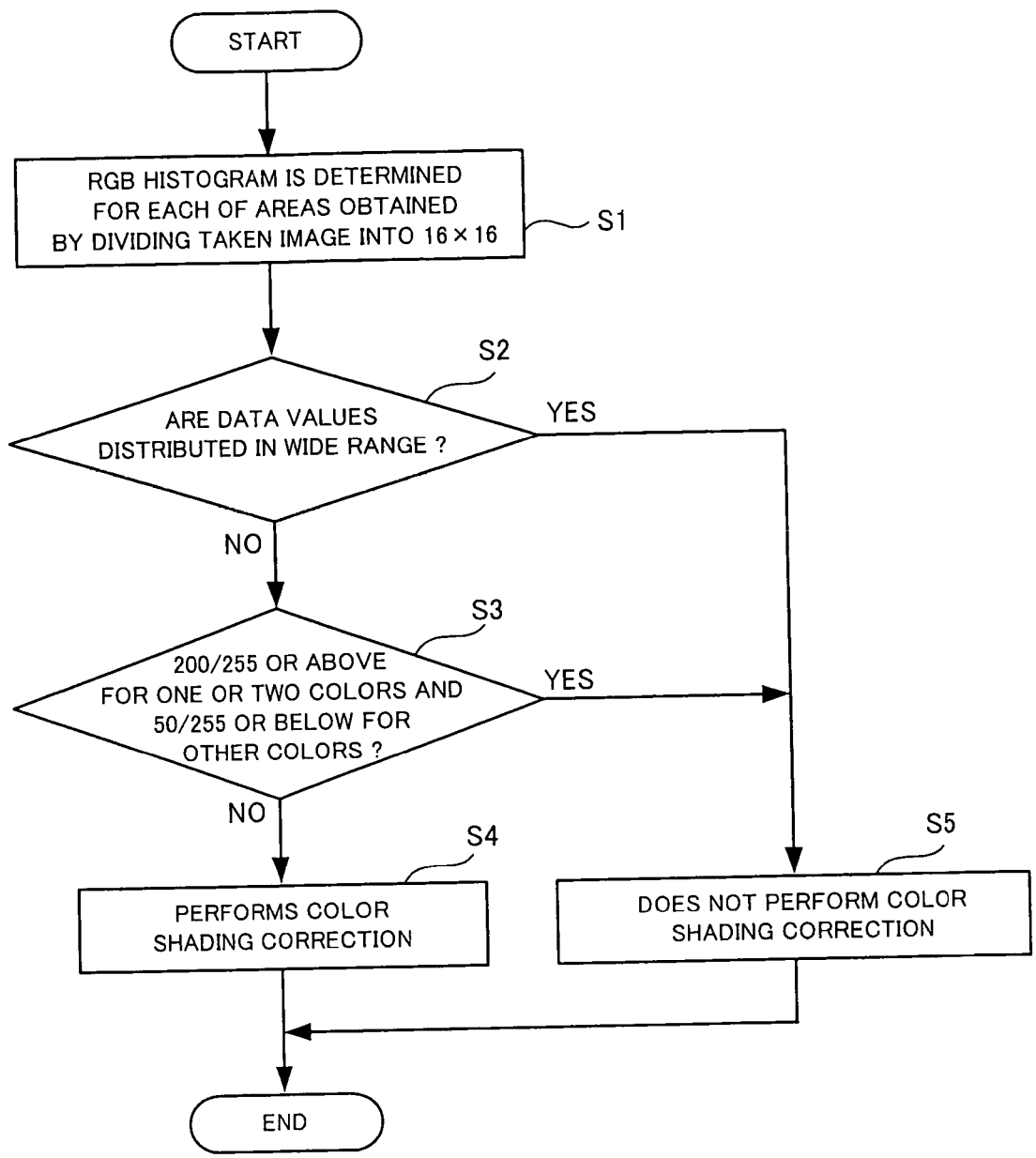
FIG. 3 is a flowchart showing a processing routine to be performed on a shading correction section, a scene determination section and a shading correction control section which constitute the digital camera shown in FIG. 2.

FIG. 3 is a flowchart showing a processing routine to be performed on the shading correction section, the scene determination section and the shading correction control section which constitute the digital camera shown in FIG. 2.

First, at step S1, an RGB histogram is determined by the MPU 128 for each of areas obtained by dividing a taken image into 16×16.

Then, at step S2, the scene determination section 144 determines whether or not data values are distributed in a wide range. If it is determined that the data values are not distributed in a wide range, that is, if a scene just shot is a scene to be corrected which includes a uniform region with a predetermined or more area, shading caused by sensitivity unevenness of the CCD 126 is apparent, and the routine proceeds to step S3. On the contrary, if it is determined that the data values are distributed in a wide range, that is, if the scene just shot does not include a uniform region with a predetermined or more area, shading caused by sensitivity unevenness of the CCD 126 is not apparent, and the routine proceeds to step S5 to be described later.

At step S3, the scene determination section 144 determines whether or not the data value for one color (or two colors) is 200 (or 255) or above and the data values for the other colors are 50 (or 255) or below (the maximum data value of one color is assumed to be 255). If it is determined that the data value for one color (or two colors) is 200 (or 255) or above and the data values for the other colors are not 50 (or 255) or below, that is, if it is determined that there is a uniform region with a predetermined or higher brightness, shading is apparent, and the routine proceeds to step S4. At step S4, color shading correction is performed and the routine is terminated. Specifically, the shading correction control section 145 causes the shading correction section 143 to perform shading correction on an image signal obtained by the image taking just performed, and then terminates the routine.

On the contrary, if it is determined that there is not a uniform region with a predetermined or higher brightness at step S3, shading is not apparent, and the routine proceeds to step S5.

At step S5, the routine is terminated without performing color shading correction. Specifically, the shading correction control section 145 controls, the shading correction section 143 not to perform shading correction on an image signal obtained by the image taking just performed, and terminates the routine.

As described above, if a scene just shot includes a uniform region with a predetermined or more area and a predetermined or higher brightness, that is, if shading caused by sensitivity unevenness of the CCD 126 is apparent, then the digital camera 100, an embodiment of the first image taking apparatus of the present invention, determines that the scene just shot is a scene to be corrected and performs shading correction. On the contrary, if the scene just shot does not include a uniform region with a predetermined or more area and a predetermined or higher brightness, shading caused by sensitivity unevenness of the CCD 126 is not apparent. Therefore, the digital camera 100 determines that the scene is not a scene to be corrected and does not perform shading correction. Thereby, processing time required for shading correction and therefore image taking time can be shortened, and a high-quality image can be obtained by prevention of deterioration of the S/N ratio.

Though description has been made on an embodiment of the first image taking apparatus of the present invention with an example where a scene just shot is determined to be a scene to be corrected if the scene just shot includes a uniform region with a predetermined or more area and a predetermined or higher brightness, the present invention may be any image taking apparatus only if it determines that a scene just shot is a scene to be corrected when the scene just shot includes a uniform region with a predetermined or more area (for example, the sky or a white wall).

Description will be now made on a digital camera, an embodiment of a second image taking apparatus of the present invention. The external view of the digital camera, an embodiment of the second image taking apparatus of the present invention, is the same as that of the digital camera 100 described above and shown in FIG. 1, and therefore it will not be shown.

Figure 4:
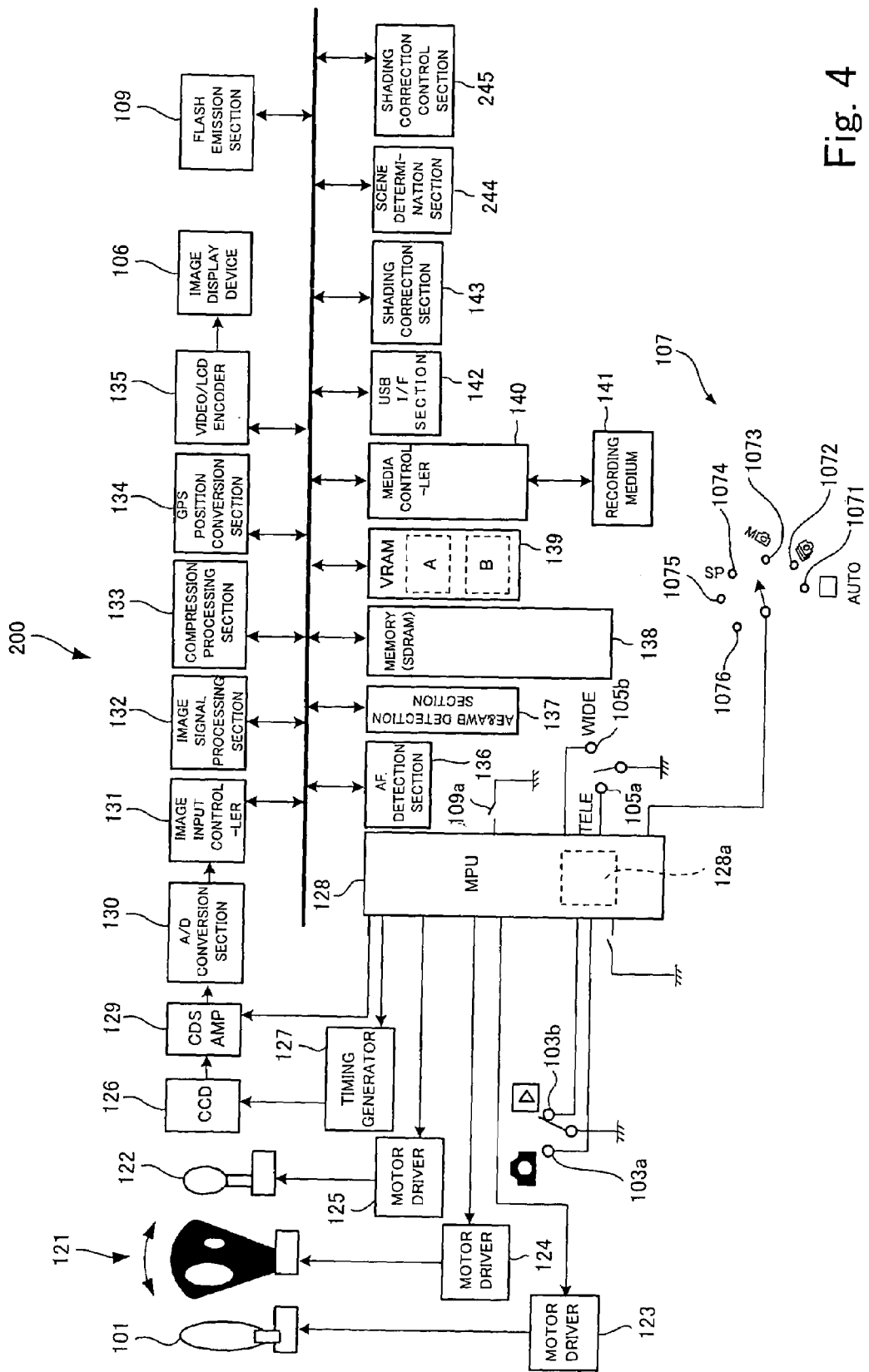
FIG. 4 shows the internal configuration of a digital camera, an embodiment of a second image taking apparatus of the present invention.

FIG. 4 shows the internal configuration of the digital camera, an embodiment of the second image taking apparatus of the present invention.

The components similar to those of the digital camera 100 shown in FIG. 2 are given the same reference numerals and description thereof will not be provided repeatedly.

A digital camera 200 shown in FIG. 4 is provided with a scene determination section 244 that determines whether or not a scene just shot is a scene to be corrected which has been shot under a predetermined or higher object brightness.

Furthermore, the digital camera 200 is provided with a shading correction control section 245 which, if the scene just shot is determined by the scene determination section 244 to be a scene to be corrected, causes the shading correction portion 143 to perform shading correction on an image signal obtained by the image taking just performed. More specifically, the shading correction control section 245 does not cause the shading correction section 143 to perform shading correction on an image signal obtained by image taking with the use of the flash emission section 109 even if a scene to be corrected is determined by the scene determination section 244.

Figure 5:
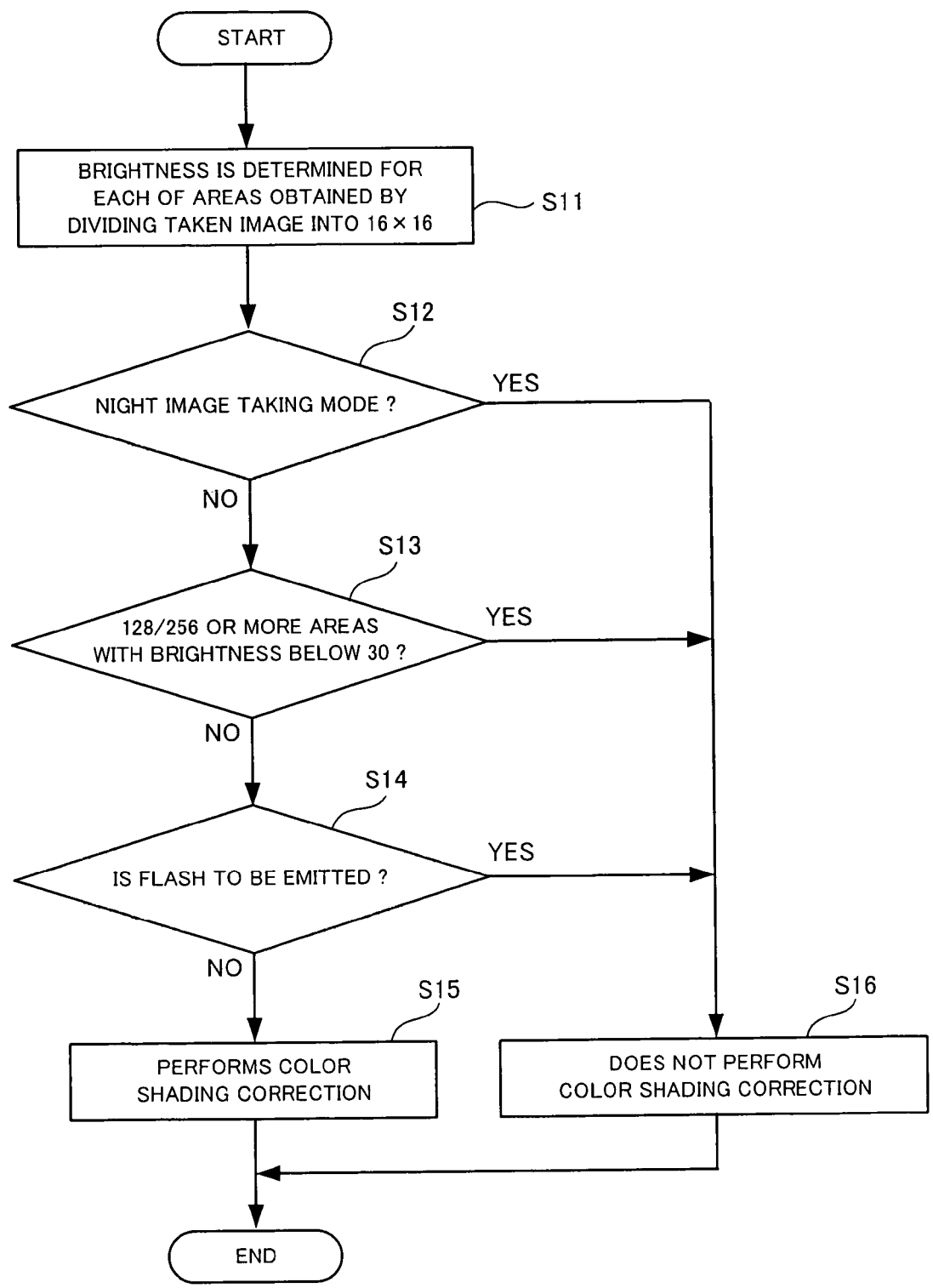
FIG. 5 is a flowchart showing a processing routine to be performed on a shading correction section, a scene determination section and a shading correction control section which constitute the digital camera shown in FIG. 4.

FIG. 5 is a flowchart showing a processing routine to be performed on the shading correction section, the scene determination section and the shading correction control section which constitute the digital camera shown in FIG. 4.

First, at step S11, the brightness is determined by the MPU 128 for each of areas obtained by dividing a taken image into 16×16.

Then, at step S12, it is determined whether or not the mode is a night image taking mode. If it is determined that the mode is the night image taking mode, shading caused by sensitivity unevenness of the CCD 126 is not apparent, and the routine proceeds to step S16 to be described later. On the contrary, if it is determined that the mode is not the night image taking mode, the routine proceeds to step S13.

At step S13, the scene determination section 244 determines whether or not the data value for areas with the brightness at or below 30 is 128/256 or above, that is, a scene just shot is a scene to be corrected which has been shot under a predetermined or higher object brightness. If it is determined that the data value for areas with the brightness at or below 30 is 128/256 or above (object brightness below the predetermined brightness), shading is not apparent, and the routine proceeds to step S16 to be described later. On the contrary, if it is determined that the data value for areas with the brightness at or below 30 is below 128/256 (object brightness at or above the predetermined brightness), then the routine proceeds to step S14.

At step S14, it is determined whether or not to emit a flash. If it is determined to emit a flash, then the routine proceeds to step S16. If it is determined not to emit a flash, the routine proceeds to step S15.

At step S15, color shading correction is performed, and the routine is terminated. Specifically, the shading correction control section 245 causes the shading correction section 143 to perform shading correction on an image signal obtained by the image taking just performed and then terminates the routine.

At step S16, the routine is terminated without performing color shading correction. Specifically, the shading correction control section 245 controls the shading correction section 143 not to perform shading correction on an image signal obtained by the image taking just performed and terminates the routine.

As described above, in the digital camera 200, an embodiment of the second image taking apparatus of the present invention, if a scene just shot is a scene to be corrected which has been shot under a predetermined or higher object brightness (for example, a scene shot under sunlight), that is, if shading caused by sensitivity unevenness of the CCD 126 is apparent, then the shading correction control section 245 determines that the scene just shot is a scene to be corrected and performs shading correction. On the contrary, the shading correction control section 245 controls the shading correction section 143 not to perform shading correction on an image signal obtained by image taking with the use of the flash emission section 109 even if a scene to be corrected is determined by the scene determination section 244. Image taking with the use of the flash emission section 109 is often performed at a relatively dark place, and therefore, by preventing shading correction from being performed as for an image signal obtained by image taking with the use of the flash emission section 109, image taking time can be shortened.

Though description has been made on an embodiment of the second image taking apparatus of the present invention with an example where, if a scene just shot has been shot under an object brightness below a predetermined brightness or with flash emission, the scene just shot is determined not to be a scene to be corrected because shading caused by sensitivity unevenness of the CCD 126 is not apparent. However, the present invention may be any image taking apparatus only if it determines a scene just shot not to be a scene to be corrected and prevents shading correction when the scene just shot has been shot under an object brightness below a predetermined object brightness. That is, the present invention may be any image taking apparatus only if it determines a scene just shot to be a scene to be corrected when the scene just shot has been shot under an object brightness above a predetermined brightness. Thereby, processing time required for shading correction and therefore image taking time can be shortened, and a high-quality image can be obtained by prevention of deterioration of the S/N ratio.

Figure 6:
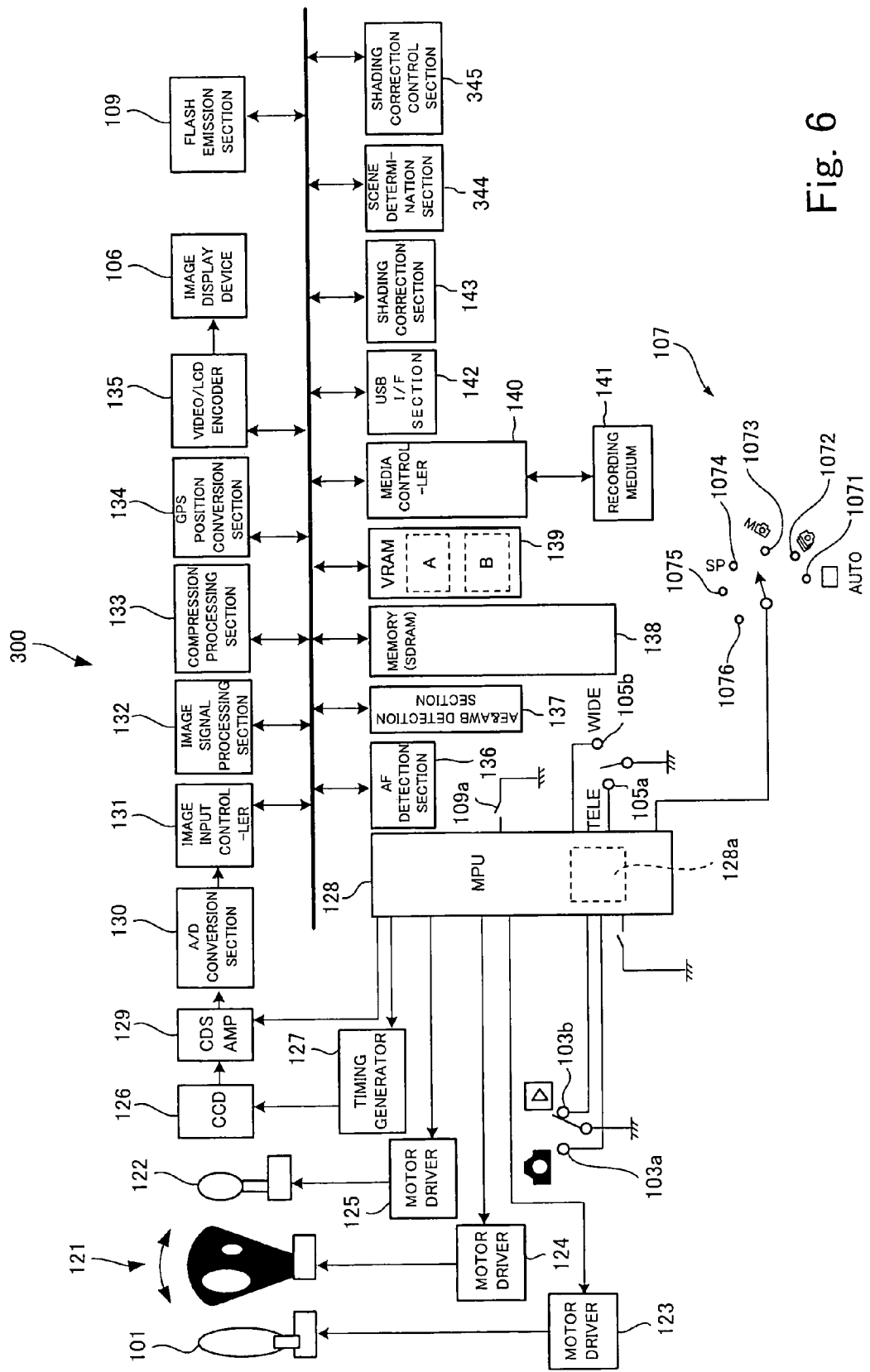
FIG. 6 shows the internal configuration of a digital camera, an embodiment of a third image taking apparatus of the present invention.
Figure 7:
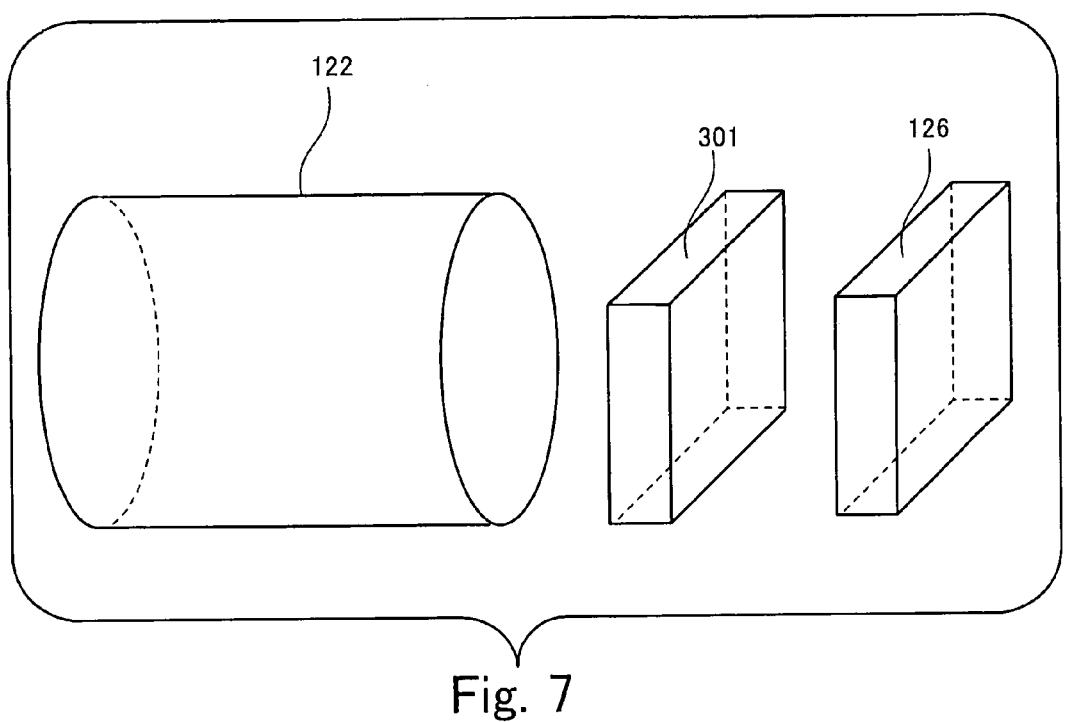
FIG. 7 shows perspective views of a focus lens, an infrared ray cutting filter and a CCD shown in FIG. 6.

FIG. 6 shows the internal configuration of a digital camera, an embodiment of the third image taking apparatus of the present invention, and FIG. 7 shows perspective views of the focus lens, the infrared ray cutting filter and the CCD shown in FIG. 6. The components similar to those of the digital camera 100 shown in FIG. 2 are given the same reference numerals and description thereof will not be provided repeatedly.

A digital camera 300 shown in FIG. 6 is provided with an infrared-ray cutting filter 301 for filtering out infrared rays in object light, which is arranged at the front of the CCD 126. Specifically, the infrared-ray cutting filter 301 is arranged between the focus lens 122 and the CCD 126 as shown in FIG. 7.

Furthermore, the digital camera 300 is provided with a scene determination section 344 that determines whether or not a scene just shot is a scene to be corrected which has been shot under a light source requiring shading correction because of spectral displacement of the infrared-ray cutting filter 301.

Furthermore, the digital camera 300 is provided with a shading correction control section 345 which, if the scene just shot is determined by the scene determination section 344 to be a scene to be corrected, causes the shading correction section 143 to perform shading correction on an image signal obtained by the image taking just performed. Specifically, the shading correction control section 345 does not cause the shading correction section 143 to perform shading correction on an image signal obtained by image taking with the use of the flash emission section 109 even if a scene to be corrected is determined by the scene determination section 344. Description will be made in more detail.

Figure 8:
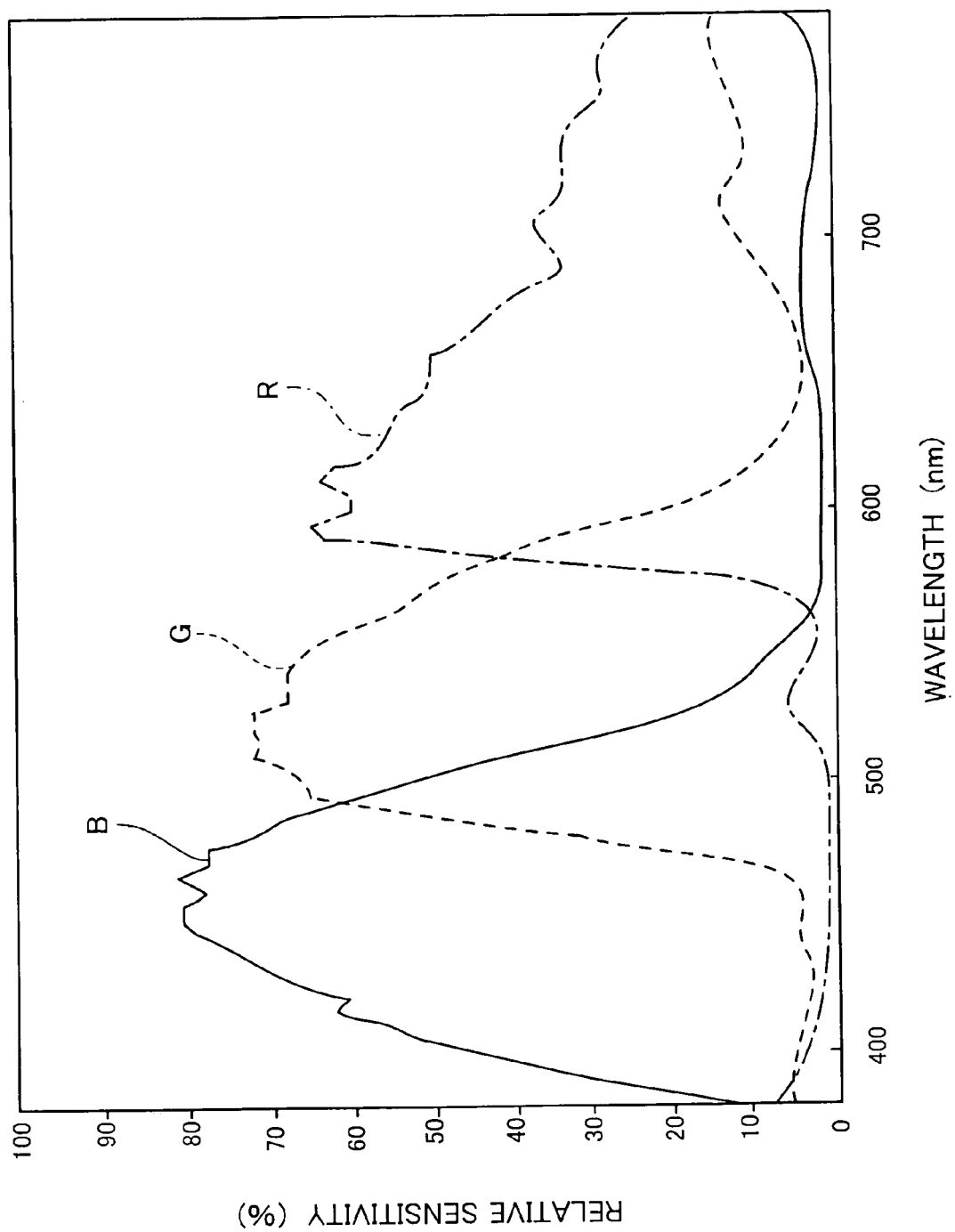
FIG. 8 shows the spectral characteristics of the CCD.

FIG. 8 shows the spectral characteristics of the CCD.

The horizontal axis of FIG. 8 indicates wavelength (nm) and the vertical axis indicates relative sensitivity (%). As shown in FIG. 8, the relative sensitivity of R (red) is the highest at the vicinity of the wavelength of 600 nm; the relative sensitivity of G (green) is the highest at the vicinity of the wavelength of 520 nm; and the relative sensitivity of B (blue) is the highest at the vicinity of the wavelength of 460 nm. Thus, the relative sensitivities against a wavelength of the CCD 126 differ from one another.

Figure 9:
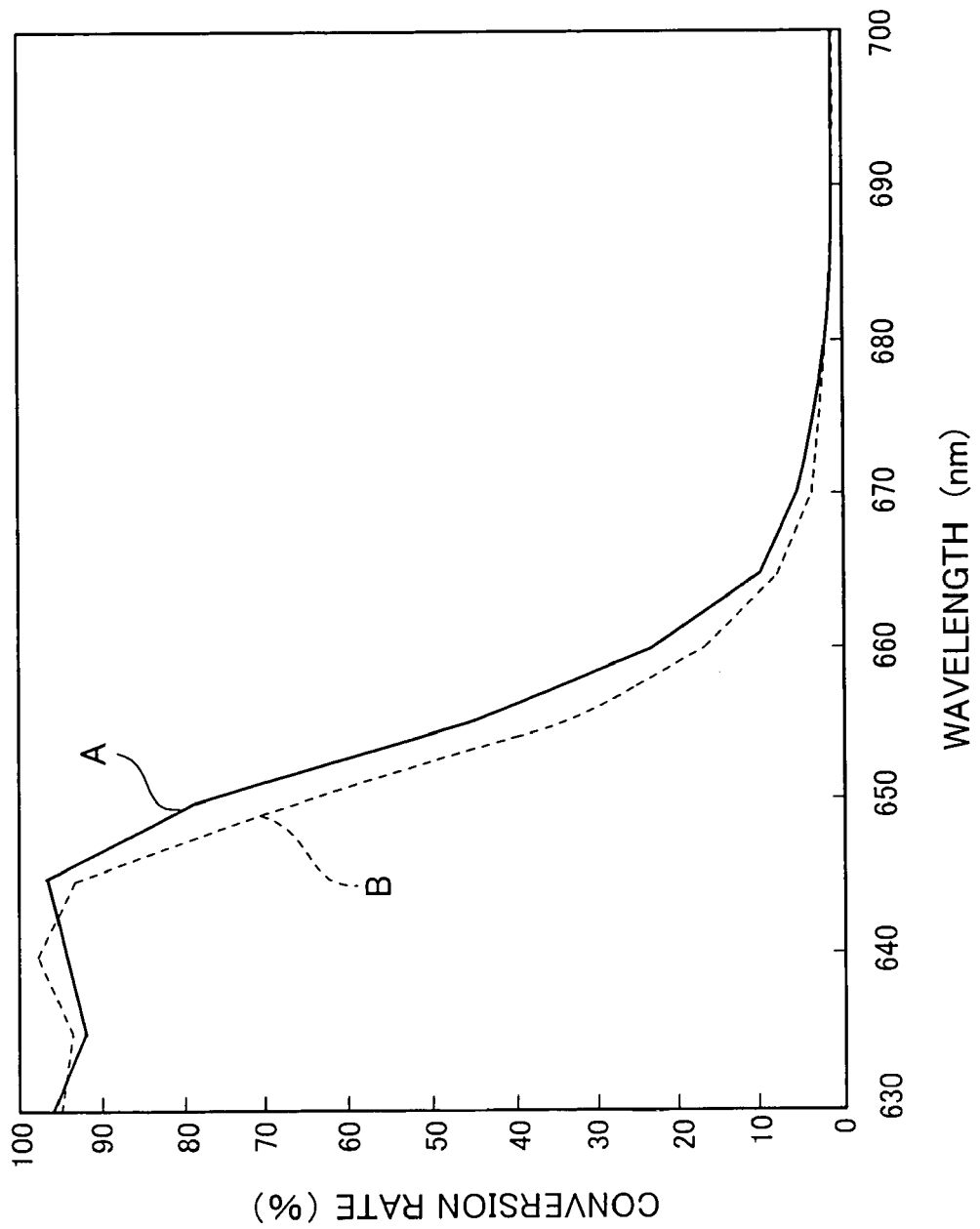
FIG. 9 shows difference in the conversion rate relative to wavelength at the left and the right of the infrared ray cutting filter.

FIG. 9 shows difference in the conversion rate relative to wavelength at the left and the right of the infrared ray cutting filter.

The horizontal axis of FIG. 9 indicates wavelength (nm), and the vertical axis indicates the conversion rate (%) relative to the wavelength of the infrared-ray cutting filter 301. A continuous line A shows the conversion rate relative to wavelength at the left half of the infrared-ray cutting filter 301. A dashed line B shows the conversion rate relative to wavelength at the right half of the infrared-ray cutting filter 301. As shown in FIG. 9, the conversion rate of the infrared-ray cutting filter 301 relative to the wavelength from 630 nm to 680 nm differs at the left half and at the right half of the filter.

Figure 10:
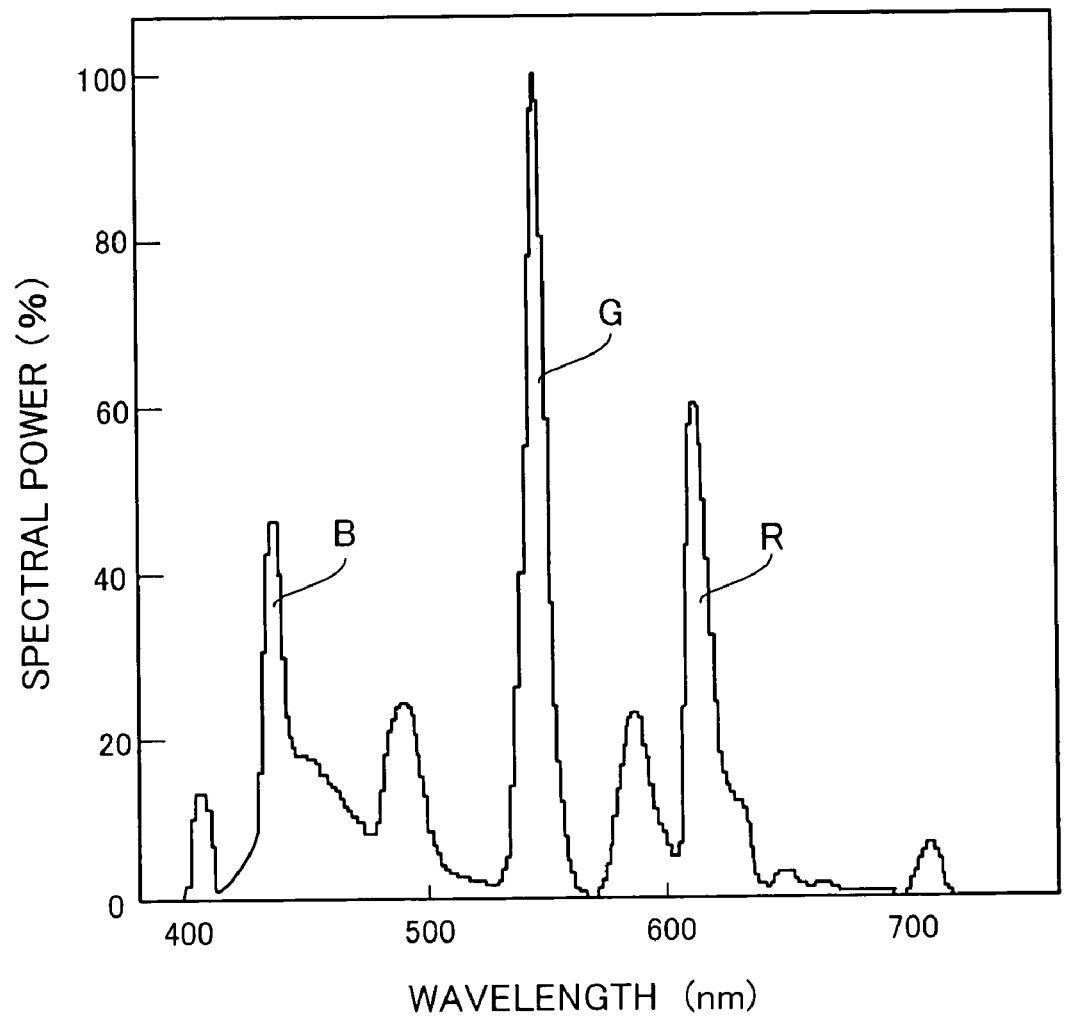
FIG. 10 shows spectral characteristics of a fluorescent light source.

FIG. 10 shows spectral characteristics of a fluorescent light source.

The horizontal axis of FIG. 10 indicates wavelength (nm), and the vertical axis indicates spectral power (%). As shown in FIG. 10, under a fluorescent light, the spectral power of G (green) is the highest; the spectral power of R (red) is the second highest; and the spectral power of B (blue) is the lowest. Thus, the spectral power of the three are significantly different.

Figure 11:
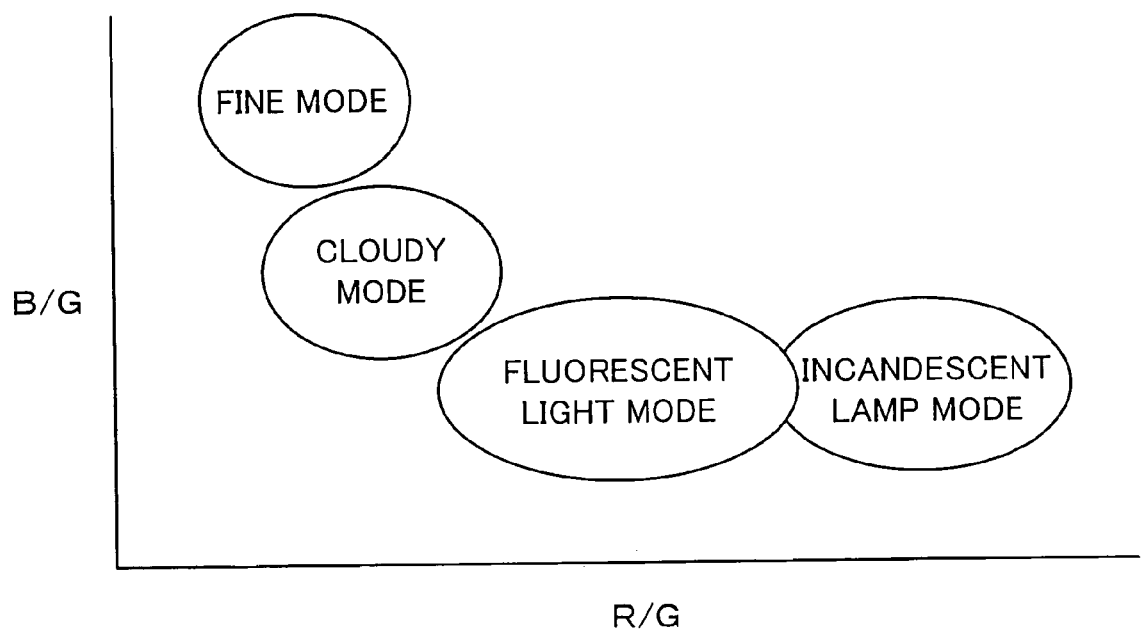
FIG. 11 shows white balance detection frames for natural light or artificial light.

FIG. 11 shows white balance detection frames for natural light or artificial light.

In a sunny mode and a cloudy mode, which are modes for image taking under natural light, the value of B/G relative to R/G is large, and therefore the color is bluish. On the contrary, in a fluorescent light mode and an incandescent lamp mode, which are modes for image taking under artificial light, the value of B/G relative to R/G is small, and therefore the color is reddish. The light wavelength distribution differs in the case of image taking under natural light and in the case of image taking under artificial light. Furthermore, under natural light, the light wavelength distribution differs in the case of the sunny mode and in the case of the cloudy mode. Similarly, under artificial light, the light source wavelength distribution differs in the case of a fluorescent light and in the case of an incandescent lamp. Therefore, even if the same object is shot via the focus lens 122 as shown in FIG. 7, the infrared-ray cutting filter 301 and the CCD 126, the image may be taken in different colors depending on the kinds of light source. Therefore, in order that a white object is always shot in white under any image taking condition, white balance detection frames for natural light and artificial light are set as shown in FIG. 11. By adjusting gain of a color signal based on these detection frames, correction for keeping color reproducibility constant is performed.

However, as described above, the relative sensitivities relative to the wavelength of the CCD 126 are different, and spectral displacement is caused in the infrared-ray cutting filter 301. Furthermore, the spectral powers of R (red), G (green) and B (blue) are significantly different from one another under a fluorescent light. Therefore, if a scene just shot has been shot under a light source requiring shading correction because of spectral displacement of the infrared ray cutting filter 301 (for example, under sunlight), the digital camera 300, an embodiment of the third image taking apparatus of the present invention, determines that the scene just shot is a scene to be corrected since shading is apparent because of cut-off frequency difference or transmittance difference at a particular frequency caused by manufacture difference of the infrared ray cutting filter 301, and then performs shading correction. On the contrary, if the scene just shot has been shot under a light source which does not require shading correction to be performed because of spectral displacement of the infrared ray cutting filter 301 (for example, under fluorescent light), there is only a particular frequency component and, therefore, only little influence by cut-off frequency difference or transmittance difference at a particular frequency, and shading is not apparent. Accordingly, the digital camera 300 determines that the scene is not a scene to be corrected and does not perform shading correction. Thereby, processing time required for shading correction and therefore image taking time can be shortened, and a high-quality image can be obtained by prevention of deterioration of the S/N ratio.

Image taking with the use of the flash emission section 109 is often performed at a relatively dark place, that is, under a light source other than a light source requiring shading correction (for example, sunlight). Accordingly, by preventing shading correction from being performed for an image signal obtained through image taking with the use of the flash emission section 109, image taking time can be further shortened.

Though description has been made on this embodiment by illustrating a digital camera as an image taking apparatus of the present invention, the image taking apparatus of the present invention is not limited thereto, and it may be a mobile telephone provided with a camera function, for example, which has been increasingly spread recently. Furthermore, the present invention is naturally not limited to still image taking and is applied to an image taking apparatus having a dynamic image taking function.

What is claimed is:

1. An image taking apparatus that performs image taking for generating an image signal by capturing, with an image pickup device, object light sent via an image taking optical system, the image taking apparatus comprising:
    a shading correction section that performs a shading correction by adjusting a gain depending on respective positions on the image pickup device;
    a scene determination section that determines whether a scene just shot comprises a scene to be corrected which includes a uniform region with a predetermined area or larger than predetermined area; and
    a shading correction control section that, if the scene just shot is determined by the scene determination section to be a scene to be corrected, causes the shading correction section to perform the shading correction on an image signal obtained by image taking just performed,
    wherein the scene determination section determines whether a data value for one color is 200 or above and the data values for other colors are 50 or below when the maximum data value of one color is assumed to be 255, and, if it is determined that the data value comprises a uniform region with a predetermined or higher brightness, shading is apparent, the shading correction control section performs the shading correction on the image.

* * * * *